US010666897B1

(12) United States Patent
Obodo (10) Patent No.: US 10,666,897 B1
(45) Date of Patent: May 26, 2020

(54) LAW ENFORCEMENT INTERACTION SYSTEM

(71) Applicant: Leonard Obodo, Knightdale, NC (US)

(72) Inventor: Leonard Obodo, Knightdale, NC (US)

( * ) Notice: Subject to any disclaimer, the term of this patent is extended or adjusted under 35 U.S.C. 154(b) by 0 days.

(21) Appl. No.: 16/237,690

(22) Filed: Jan. 1, 2019

Related U.S. Application Data

(60) Provisional application No. 62/694,724, filed on Jul. 6, 2018.

(51) Int. Cl.
| | |
|---|---|
| *H04N 7/14* | (2006.01) |
| *H04L 12/58* | (2006.01) |
| *G06F 21/32* | (2013.01) |
| *G06Q 50/26* | (2012.01) |
| *H04W 4/029* | (2018.01) |

(52) U.S. Cl.
CPC ............ *H04N 7/147* (2013.01); *G06F 21/32* (2013.01); *G06Q 50/265* (2013.01); *H04L 51/046* (2013.01); *H04W 4/029* (2018.02)

(58) Field of Classification Search
CPC .... H04N 7/147; G06Q 50/265; H04L 51/046; H04W 4/029; G06F 21/32
See application file for complete search history.

(56) References Cited

U.S. PATENT DOCUMENTS

| | | | | |
|---|---|---|---|---|
| 6,408,304 | B1* | 6/2002 | Kumhyr | G06Q 10/10 |
| 6,873,246 | B1* | 3/2005 | Ligoci, Sr. | B60R 25/043 |
| | | | | 123/179.2 |
| 2002/0036565 | A1* | 3/2002 | Monroe | G08G 1/017 |
| | | | | 340/425.5 |
| 2002/0116117 | A1* | 8/2002 | Martens | G08G 1/017 |
| | | | | 701/115 |
| 2002/0186297 | A1* | 12/2002 | Bakewell | G08G 1/0175 |
| | | | | 348/118 |
| 2003/0071730 | A1* | 4/2003 | Valbh | G07B 15/00 |
| | | | | 340/572.1 |
| 2009/0175507 | A1* | 7/2009 | Schaffner | G06Q 90/00 |
| | | | | 382/117 |
| 2010/0042647 | A1* | 2/2010 | Schultz | H04L 12/1831 |
| | | | | 379/85 |

(Continued)

*Primary Examiner* — Oyesola C Ojo
(74) *Attorney, Agent, or Firm* — Kyle A. Fletcher, Esq.

(57) ABSTRACT

The law enforcement interaction system is a subscription based communication system. The law enforcement interaction system establishes a plurality of authenticated communication links between a subscriber, an appropriate authority, a data management authority, and a supervisory authority. The law enforcement interaction system deescalates the tension between the safety concerns of the appropriate authority the natural suspicions of the subscriber. Each of the plurality of authenticated communication links allows the subscriber, an appropriate authority, and a supervisory authority to exchange authenticated information through the data management authority. By exchanging authenticated information through the data management authority, the subscriber and the appropriate authority remain physically separated by remaining in their respective vehicles. The law enforcement interaction system is a process that comprises a method to establish the communication links and perform subscriber authentication, a method to document the transaction, and a method to terminate the communication links.

17 Claims, 6 Drawing Sheets

(56) References Cited

U.S. PATENT DOCUMENTS

| | | | |
|---|---|---|---|
| 2010/0214083 A1* | 8/2010 | McNay | B60R 25/25 340/426.1 |
| 2015/0095251 A1* | 4/2015 | Alazraki | G06Q 50/265 705/325 |
| 2016/0173950 A1* | 6/2016 | Brown, Jr. | G08B 13/196 725/116 |
| 2018/0012324 A1* | 1/2018 | Kelts | G06Q 30/018 |

* cited by examiner

LAW ENFORCEMENT INTERACTION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electric communication techniques and wireless communication networks, more specifically, a network management method for locating network equipment with additional information processing. (H04W64/006)

SUMMARY OF INVENTION

The law enforcement interaction system is a subscription based communication system. The law enforcement interaction system establishes a plurality of authenticated communication links between a subscriber, an appropriate authority, a data management authority, and a supervisory authority. The scenario of use for the law enforcement interaction system is represented by a traffic stop. Specifically, this disclosure assumes that a subscriber in a first vehicle has been stopped by an appropriate authority for a reasonable articulable suspicion. The appropriate authority is assumed to be in a second vehicle. The law enforcement interaction system deescalates the tension between the safety concerns of the appropriate authority the natural suspicions of the subscriber. Each of the plurality of authenticated communication links allows the subscriber, an appropriate authority, and a supervisory authority to exchange authenticated information through the data management authority. By exchanging authenticated information through the data management authority, the subscriber and the appropriate authority remain physically separated by remaining in their respective vehicles. The law enforcement interaction system is a process that comprises a method to establish the communication links and perform subscriber authentication, a method to document the transaction, and a method to terminate the communication links.

These together with additional objects, features and advantages of the law enforcement interaction system will be readily apparent to those of ordinary skill in the art upon reading the following detailed description of the presently preferred, but nonetheless illustrative, embodiments when taken in conjunction with the accompanying drawings.

In this respect, before explaining the current embodiments of the law enforcement interaction system in detail, it is to be understood that the law enforcement interaction system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the law enforcement interaction system.

It is therefore important that the claims be regarded as including such equivalent construction insofar as they do not depart from the spirit and scope of the law enforcement interaction system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

Figure 1:
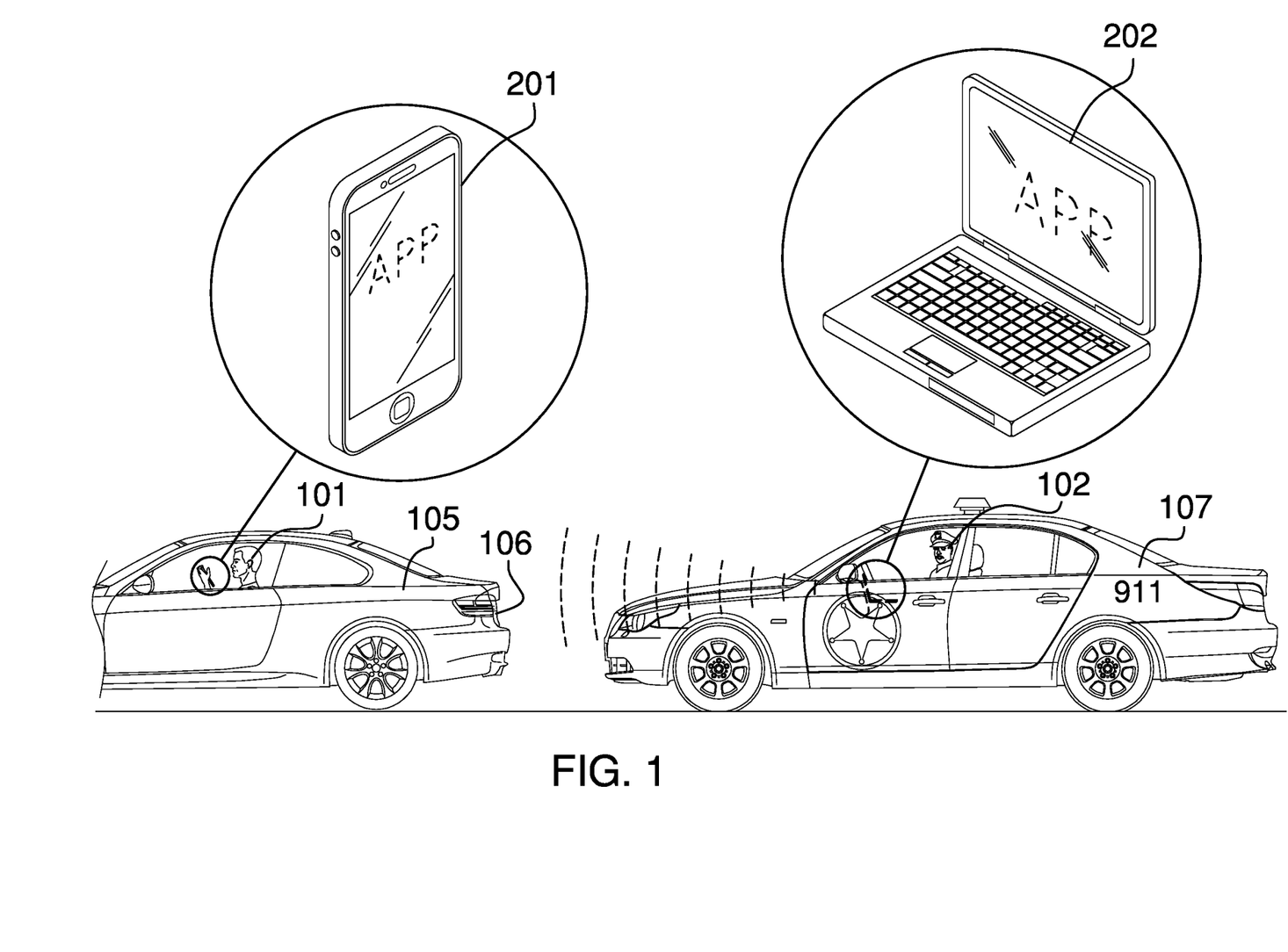
FIG. 1 is an in-use view of an embodiment of the disclosure.
Figure 2:
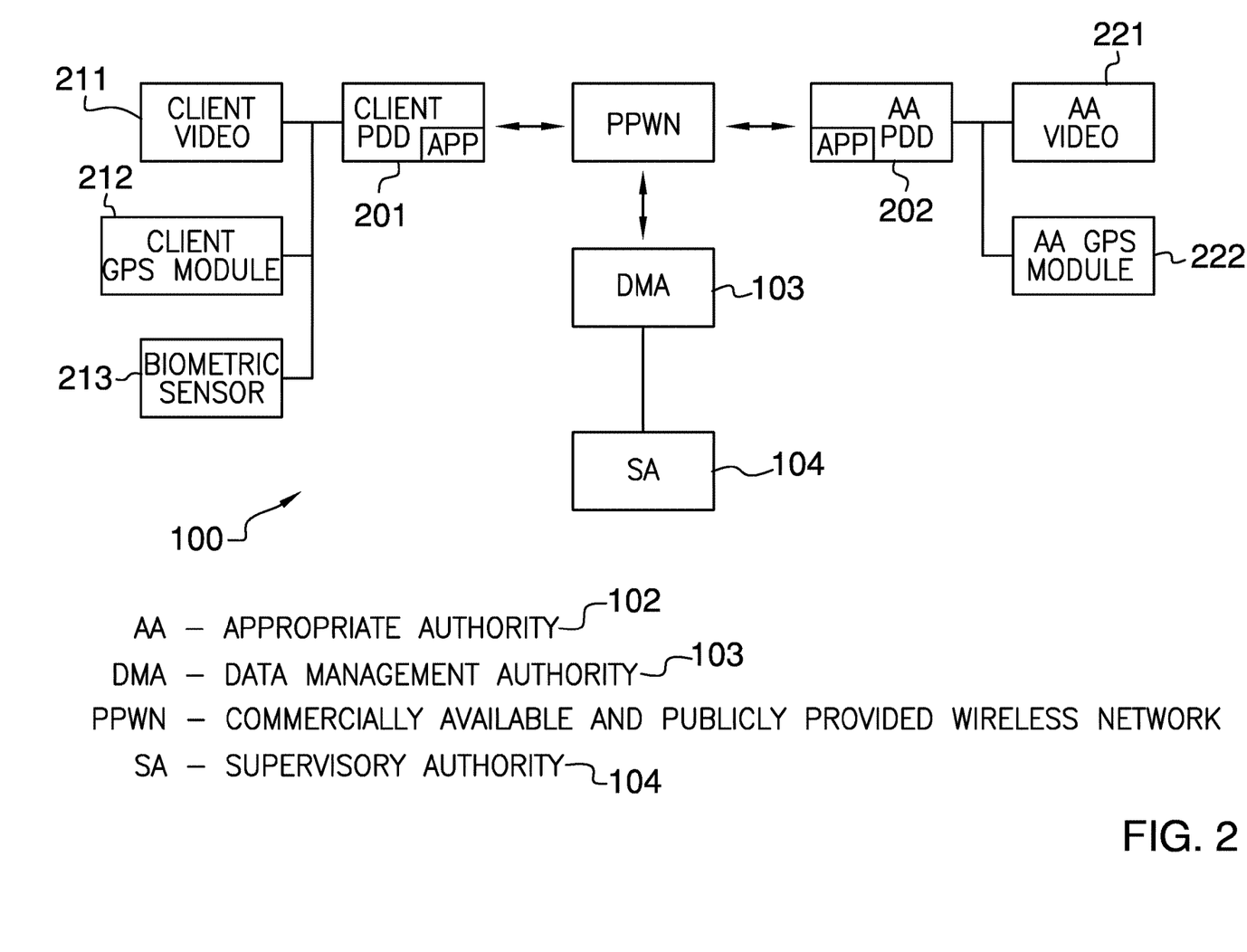
FIG. 2 is a block diagram or schematic view of an embodiment of the disclosure.

The law enforcement interaction system 100 (hereinafter invention) is a subscription-based communication system. The invention 100 establishes a plurality of authenticated communication links between a subscriber 101, an appropriate authority 102, a data management authority 103, and a supervisory authority. The scenario of use for the invention is represented by a traffic stop. Specifically, this disclosure assumes that a subscriber 101 in a first vehicle 105 has been stopped by an appropriate authority 102 for a reasonable articulable suspicion. The appropriate authority 102 is assumed to be in a second vehicle 107. The invention 100 deescalates the tension between the safety concerns of the appropriate authority 102 the natural suspicions of the subscriber 101. Each of the plurality of authenticated communication links allows the subscriber 101, an appropriate authority 102, and a supervisory authority to exchange authenticated information through the data management authority 103. By exchanging authenticated information through the data management authority 103, the subscriber 101 and the appropriate authority 102 remain physically separated by remaining in their respective vehicles. The invention 100 is a process that comprises a method to establish the communication links and perform subscriber 101 authentication, a method to document the transaction, and a method to terminate the communication links.

This disclosure assumes that the first vehicle 105 further comprises a visible registration number 106.

The subscriber 101 further comprises a subscriber 101 personal data device 201. The subscriber 101 personal data device 201 is a programmable electrical device that provides data management and communication services through one or more functions referred to as a subscriber 101 application 114. The subscriber 101 application 114 is a set of logical operating instructions that are performed by the subscriber 101 personal data device 201. The addition of a subscriber 101 application 114 will provide increased functionality for the subscriber 101 personal data device 201. This disclosure assumes that a subscriber 101 application 114 exists for the purpose of interacting with the invention 100. Methods to design and implement a subscriber 101 application 114 on a subscriber 101 personal data device 201 are well known and documented in the electrical arts.

The subscriber 101 personal data device 201 further comprises a subscriber 101 video module 211, a subscriber 101 GPS module 212, a subscriber 101 biometric sensor 213, and a subscriber 101 application 114.

The subscriber 101 video module 211 is an electronic device. The subscriber 101 video module 211 transmits and receives video and audio of the interior of the first vehicle which generates a subscriber 101 video communication link 111 with the data management authority 103.

The subscriber 101 GPS module 212 is an electrical device that communicates with the GPS to determine the GPS coordinates of the subscriber 101 GPS module 212. When queried by the subscriber 101 personal data device 201, the subscriber 101 GPS module 212 transfers the GPS coordinates to the subscriber 101 personal data device 201. The subscriber 101 GPS module 212 generates a subscriber 101 GPS coordinates 112 used to authenticate the location of the subscriber 101.

The subscriber 101 biometric sensor 213 is an electronic device. The subscriber 101 biometric sensor 213 generates the subscriber 101 biometric authentication 113 for the supervisory authority 104 before the supervisory authority 104 establishes the plurality of communication bridges. The use of a subscriber 101 biometric sensor 213 for this purpose is well-known and documented in the electrical and security arts.

The appropriate authority 102 further comprises an appropriate authority 102 personal data device 202. The appropriate authority 102 personal data device 202 is a programmable electrical device that provides data management and communication services through one or more functions referred to as an appropriate authority 102 application. The appropriate authority 102 application is a set of logical operating instructions that are performed by the appropriate authority 102 personal data device 202. The addition of an appropriate authority 102 application will provide increased functionality for the appropriate authority 102 personal data device 202. This disclosure assumes that an appropriate authority 102 application exists for the purpose of interacting with the invention 100. Methods to design and implement an appropriate authority 102 application on an appropriate authority 102 personal data device 202 are well known and documented in the electrical arts.

The appropriate authority 102 personal data device 202 further comprises an appropriate authority 102 video module 221 and an appropriate authority 102 GPS module 222.

The appropriate authority 102 video module 221 is an electronic device. The appropriate authority 102 video module 221 transmits and receives video and audio of the interior of the second vehicle 107 which generates the appropriate authority 102 first video communication link 121 and the appropriate authority 102 second video communication link 123 with the data management authority 103.

The appropriate authority 102 GPS module 222 is an electrical device that communicates with the GPS to determine the GPS coordinates of the appropriate authority 102 GPS module 222. When queried by the appropriate authority 102 personal data device 202, the appropriate authority 102 GPS module 222 transfers the GPS coordinates to the appropriate authority 102 personal data device 202. The appropriate authority 102 GPS module 222 generates the appropriate authority 102 GPS coordinates 122 used to authenticate the location of the appropriate authority 102.

The data management authority 103 manages the subscriber 101 information 131 and a plurality of communication bridges. The supervisory authority 104 maintains a continuous communication link between the data management authority 103 and the supervisory authority 104 that is referred to as the supervisory authority 104 video communication link 141.

Figure 3A:
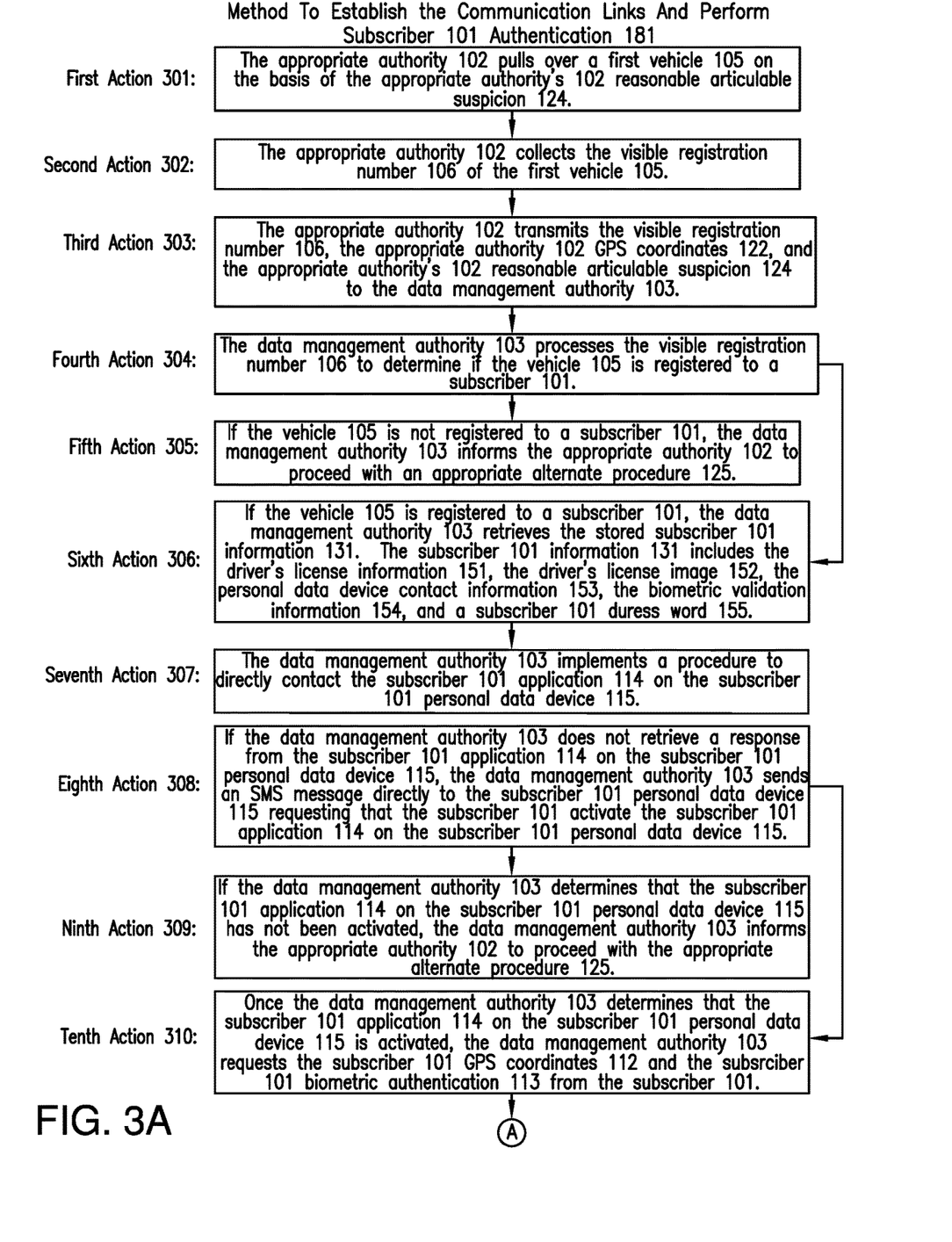
FIG. 3A is a flow diagram of an embodiment of the disclosure.
Figure 3B:
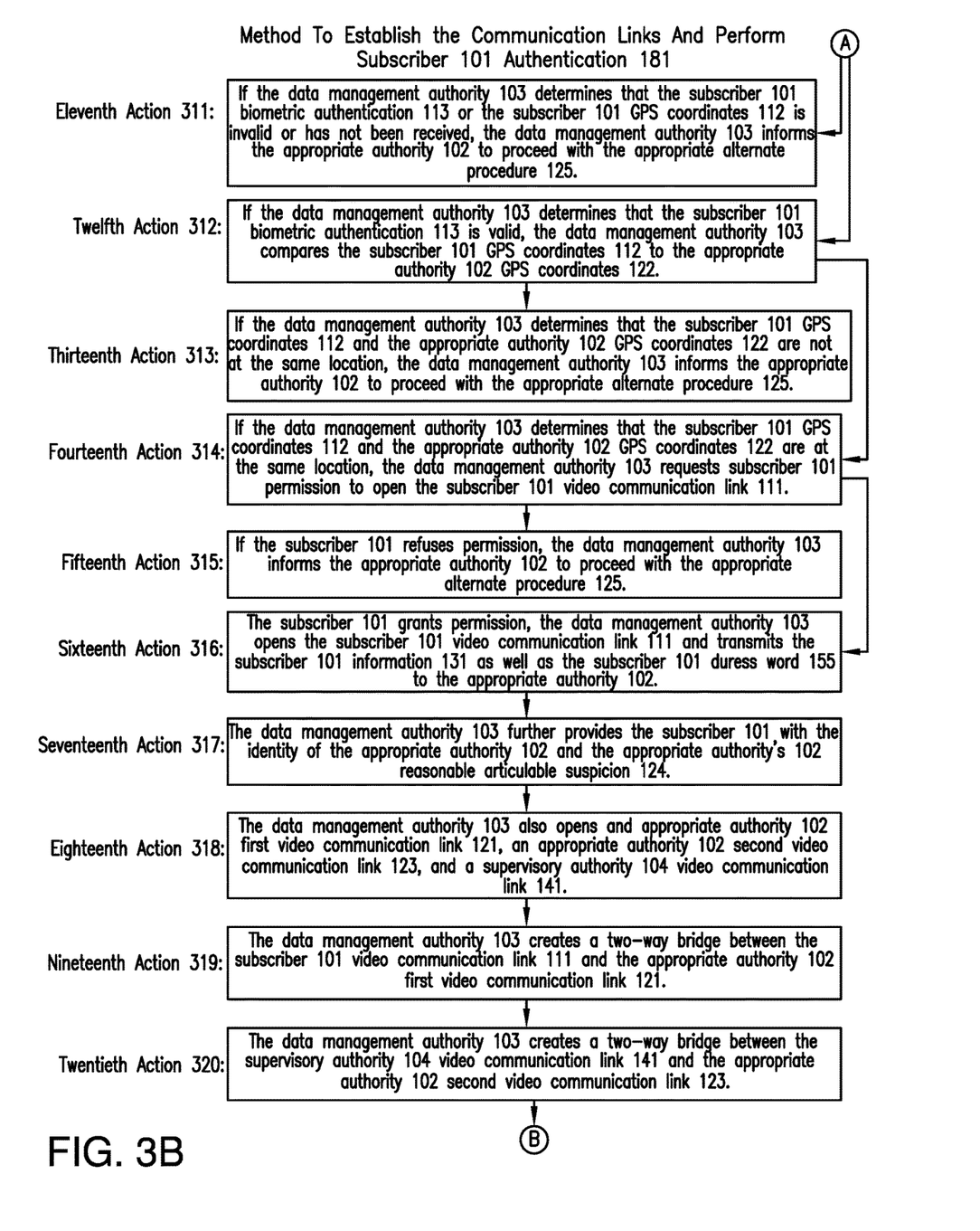
FIG. 3B is a flow diagram of an embodiment of the disclosure.
Figure 3C:
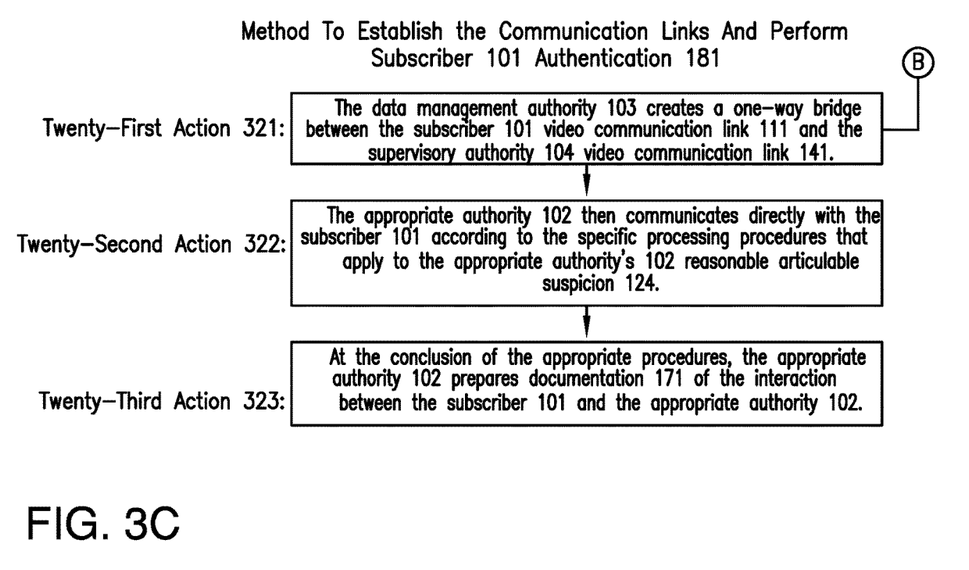
FIG. 3C is a flow diagram of an embodiment of the disclosure.

The method to establish the communication links and perform subscriber 101 authentication 181 is a method that establishes a two-way bridge between the subscriber 101 video communication link 111 and the appropriate authority 102 first video communication link 121 after confirmation of the identification of the subscriber 101. The method to establish the communication links and perform subscriber 101 authentication comprises a first action 301, a second action 302, a third action 303, a fourth action 304, a fifth action 305, a sixth action 306, a seventh action 307, an eighth action 308, a ninth action 309, a tenth action 310, an eleventh action 311, a twelfth action 312, a thirteenth action 313, a fourteenth action 314, a fifteenth action 315, a sixteenth action 316, a seventeenth action 317, an eighteenth action 318, a nineteenth action 319, a twentieth action 320, a twenty-first action 321, a twenty-second action 322, and a twenty-third action 323.

As shown most clearly in FIGS. 3*a*, 3*b*, and 3*c*, the following ten paragraphs describe the method to establish the communication links and perform subscriber 101 authentication 181.

The appropriate authority 102 takes the first action 301 to pull over a first vehicle 105 on the basis of the appropriate authority's 102 reasonable articulable suspicion 124. The appropriate authority 102 takes the second action 302 to collect the visible registration number 106 of the first vehicle. The appropriate authority 102 takes the third action 303 to transmit the visible registration number 106, the appropriate authority 102 gaps coordinates 122, and the appropriate authority's 102 reasonable articulable suspicion 124 to the data management authority 103.

The data management authority 103 takes the fourth action 304 to process the visible registration number 106 to determine if the vehicle 105 is registered to a subscriber 101. If the vehicle 105 is not registered to a subscriber 101, the data management authority 103 takes the fifth action 305 to inform the appropriate authority 102 to proceed with an appropriate alternate procedure 125. If the vehicle 105 is registered to a subscriber 101, the data management authority 103 takes the sixth action 306 to retrieve the stored subscriber 101 information 131. The subscriber 101 information 131 includes the driver's license information 151, the driver's license image 152, the personal data device contact information 153, the biometric validation information 154, and a subscriber 101 duress word 155.

The data management authority 103 further takes the seventh action 307 to implement a procedure to directly contact the subscriber 101 application 114 on the subscriber 101 personal data device 115. If the data management authority 103 does not receive a response from the subscriber 101 application 114 on the subscriber 101 personal data device 115, the data management authority 103 takes the eighth action 308 to send an SMS message directly to the subscriber 101 personal data device 115 requesting that the subscriber 101 activate the subscriber 101 application 114 on the subscriber 101 personal data device 115. If the data management authority 103 determines that the subscriber 101 application 114 on the subscriber 101 personal data device 115 has not been activated, the data management authority 103 takes the ninth action 309 to inform the appropriate authority 102 to proceed with the appropriate alternate procedure 125.

Once the data management authority 103 determines that the subscriber 101 application 114 on the subscriber 101 personal data device 115 is activated, the data management authority 103 takes the tenth action 310 to request the subscriber 101 GPS coordinates 112 and the subscriber 101 biometric authentication from the subscriber 101.

If the data management authority 103 determines that the subscriber 101 biometric authentication 113 or the subscriber 101 GPS coordinates 112 is invalid or has not been received, the data management authority 103 takes the eleventh action 311 to inform the appropriate authority 102 to proceed with the appropriate alternate procedure 125. If the data management authority 103 determines that the subscriber 101 biometric authentication 113 is valid, the data management authority 103 takes the twelfth action 312 to compare the subscriber 101 GPS coordinates 112 to the appropriate authority 102 GPS coordinates 122.

If the data management authority 103 determines that the subscriber 101 GPS coordinates 112 and the appropriate authority GPS coordinates 122 are not at the same location, the data management authority 103 takes the thirteenth action 313 to inform the appropriate authority 102 to proceed with the appropriate alternate procedure 125. If the data management authority 103 determines that the subscriber 101 GPS coordinates and the appropriate authority 102 GPS coordinates 122 are at the same location, the data management authority 103 takes the fourteenth action 314 to request subscriber 101 permission to open the subscriber 101 video communication link 111. If the subscriber 101 refuses permission, the data management authority takes the fifteenth action 315 to inform the appropriate authority 102 to proceed with the appropriate alternate procedure 125.

If the subscriber 101 grants permission, the data management authority 103 takes the sixteenth action 316 to open the subscriber 101 video communication link 111 and transmits the subscriber 101 information 131 as well as the subscriber 101 duress word 155 to the appropriate authority 102.

The data management authority 103 further takes the seventeenth action 317 to provide the subscriber 101 with the identity of the appropriate authority 102 and the appropriate authority's 102 reasonable articulable suspicion 124. The data management authority 103 further takes the eighteenth action 318 to open the appropriate authority 102 first video communication link 121, the appropriate authority 102 second video communication link 123, and the supervisory authority 104 video communication link 141.

The data management authority 103 further takes the nineteenth action 319 to create a two-way bridge between the subscriber 101 video communication link 111 and the appropriate authority 102 first video communication link 121. The data management authority 103 further takes the twentieth action 320 to create a two-way bridge between the supervisory authority 104 video communication link 141 and the appropriate authority 102 second video communication link 123. The data management authority 103 further takes the twenty-first action 321 to create a one-way bridge between the subscriber 101 video communication link 111 and the supervisory authority 104 video communication link 141.

The appropriate authority 102 further takes the twenty-second action 322 to then communicate directly with the subscriber 101 according to the specific processing procedures that apply to the appropriate authority's 102 reasonable articulable suspicion 124. At the conclusion of the appropriate procedures, the appropriate authority 102 takes the twenty-third action 323 to prepare documentation 171 of the interaction between the subscriber 101 and the appropriate authority 102.

Figure 4:
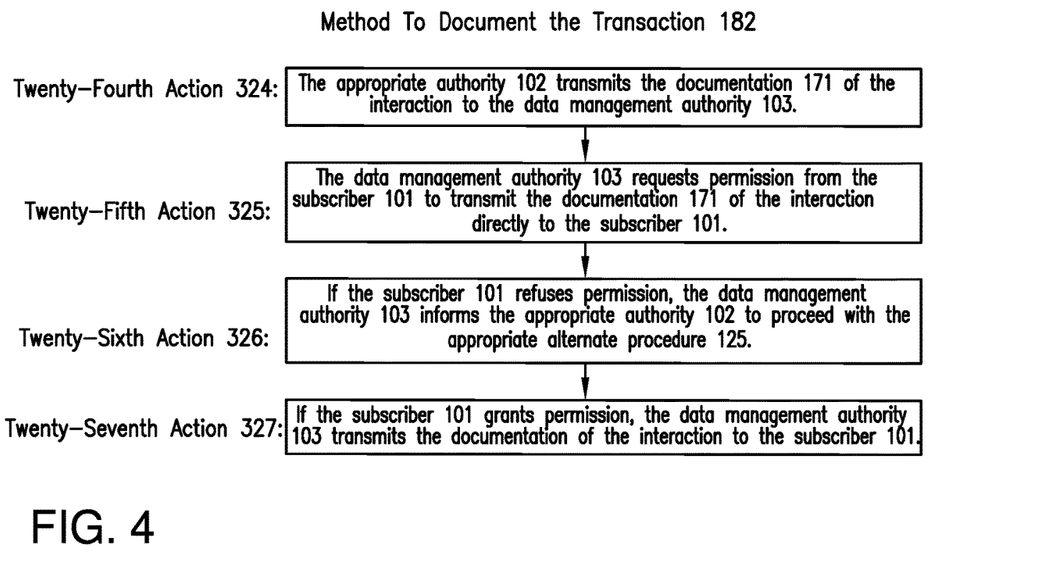
FIG. 4 is a flow diagram of an embodiment of the disclosure.

The method to document the transaction 182 is a method that allows for the transmittal of documentation between the appropriate authority 102 and the subscriber 101. The method to document the transaction 182 comprises a twenty-fourth action 324, a twenty-fifth action 325, a twenty-sixth action 326, and a twenty-seventh action 327.

As shown most clearly in FIG. 4, this paragraph describes the method to document the transaction 182. The appropriate authority 102 takes the twenty-fourth action 324 to transmit the documentation 171 of the interaction to the data management authority 103. The data management authority 103 takes the twenty-fifth action 325 to request permission from the subscriber 101 to transmit the documentation 171 of the interaction directly to the subscriber 101. If the subscriber 101 refuses permission, the data management authority 103 takes the twenty-sixth action 326 to inform the appropriate authority to proceed with the appropriate alternate procedure 125. If the subscriber 101 grants permission, the data management authority 103 takes the twenty-seventh action 327 to transmit the documentation 171 of the interaction to the subscriber 101.

Figure 5:
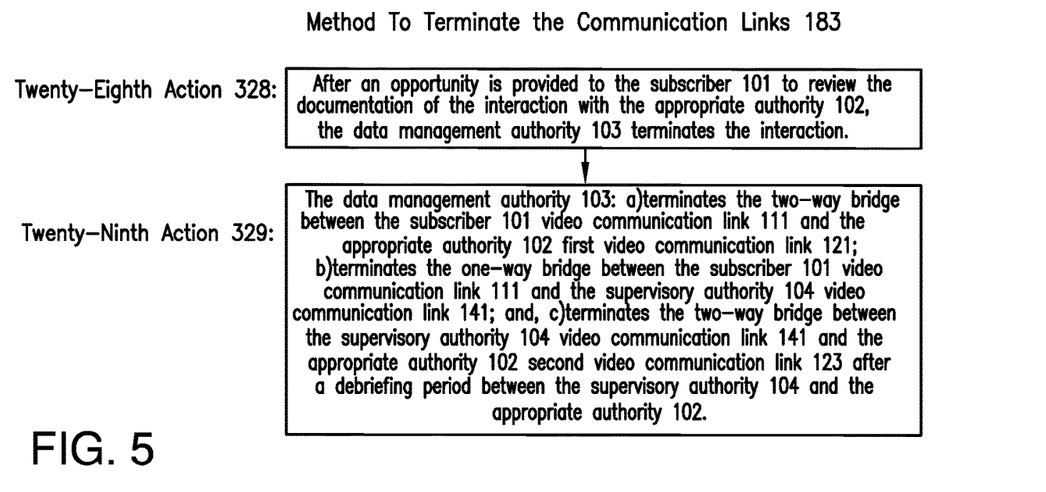
FIG. 5 is a flow diagram of an embodiment of the disclosure.

The method to terminate the communication links 183 is a method that closes down the two-way bridge between the subscriber 101 video communication link 111 and the appropriate authority 102 first video communication link 121 after the transaction between the appropriate authority 102 and the subscriber 101 has been completed. The method to terminate the communication links 183 comprises a twenty-eighth action 328 and a twenty-ninth action 329.

As shown most clearly in FIG. 5, this paragraph describes the method to terminate the communication links 183. After an opportunity is provided to the subscriber 101 to review the documentation of the interaction with the appropriate authority 102, the data management authority 103 takes the twenty-eighth action 328 to terminate the interaction. Specifically, the data management authority 103: takes the twenty-ninth action 329 to: a) terminate the two way bridge between the subscriber 101 video communication link 111 and the appropriate authority 102 first video communication link 121; b) terminate the one way bridge between the subscriber 101 video communication link 111 and the supervisory authority 104 video communication link 141; and, c) terminate the two way bridge between the supervisory authority 104 video communication link 141 and the appropriate authority 102 second video communication link 123 after a debriefing period between the supervisory authority 104 and the appropriate authority 102.

The following definitions were used in this disclosure:

Appropriate Authority: As used in this disclosure, an appropriate authority is a previously determined person or organization that is designated to monitor compliance with, and if necessary enforce, regulatory and legal mandates.

Biometric Device: As used in this disclosure, a biometric device is a security device that identifies an individual through the use of a unique and measurable physiological characteristic of the individual. Typical unique and measurable physiological characteristic include, but are not limited to, fingerprints, DNA, or retina of the eye.

Cable: As used in this disclosure, a cable is a collection of insulated wires covered by a protective casing that is used for transmitting electricity or telecommunication signals.

Commercially Provided And Publicly Available Cellular Wireless Network: As used in this disclosure, a commercially provided and publicly available cellular wireless network refers to subscription-based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Database: As used in this disclosure, a database refers to: 1) a set of data that is organized and stored in a manner that allows for the search and retrieval of data from the data set; or, 2) the electronic device that stores and organizes a data set as described in the first definition.

GPS: As used in this disclosure, and depending on the context, GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Hardwired: As used in this disclosure, the term hardwired refers to a physical electrical connection, generally using cable, between two electrical circuits or circuit elements. Such a hardwired connection is considered more reliable than a wireless connection.

Logical Device: As used in this disclosure, a logical device is a programmable electrical device that processes externally provided inputs to generate outputs that are determined from a previously programmed set of instructions.

PDD: As used in this disclosure, PDD is an acronym for a personal data device.

Personal Data Device: As used in this disclosure, a personal data device is a handheld logical device that is used for managing personal information and communication. Examples of personal data device include, but are not limited to, cellular phones, tablets, and smartphones. See logical device PPWN: As used in this disclosure, the PPWN is an acronym for a publically provided wireless network. The PPWN refers to a commercially provided and publicly available cellular wireless network.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Supervisory: As used in this disclosure, supervisory describes a relationship between a first object and a second object wherein the function of the first object is limited to initiating and monitoring the actions or activity of the second object. The first object is said to supervise the second object.

Supervisory Authority: As used in this disclosure, a supervisory authority describes a supervisory relationship between an appropriate authority and a supervisory authority wherein the supervisory authority: a) monitors the activities of the appropriate authority; and, b) provides information to the appropriate authority that is relevant to the activities of the appropriate authority.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A law enforcement interaction method comprising:
a method to establish communication links and perform subscriber authentication, a method to document the transaction, and a method to terminate the communication links;
wherein the law enforcement interaction method is a subscription-based communication system;
wherein the law enforcement interaction method establishes a plurality of authenticated communication links between a subscriber, an appropriate authority, a data management authority, and a supervisory authority;

wherein each of the plurality of authenticated communication links allows the subscriber, the appropriate authority, and the supervisory authority to exchange authenticated information through the data management authority;

wherein by exchanging authenticated information through the data management authority, the subscriber and the appropriate authority remain physically separated by remaining in their respective vehicles;

wherein the method to establish the communication links and perform subscriber authentication is a method that establishes a two-way bridge between the subscriber video communication link and the appropriate authority first video communication link after confirmation of the identification of the subscriber;

wherein the subscriber further comprises a subscriber personal data device;

wherein the appropriate authority further comprises an appropriate authority personal data device;

wherein the subscriber personal data device further comprises a subscriber video module, a subscriber GPS module, a subscriber biometric sensor, and a subscriber application;

wherein the appropriate authority personal data device further comprises an appropriate authority video module and an appropriate authority GPS module;

wherein the method to establish the communication links and perform subscriber authentication comprises a first action, a second action, a third action, a fourth action, a fifth action, a sixth action, a seventh action, an eighth action, a ninth action, a tenth action, an eleventh action, a twelfth action, a thirteenth action, a fourteenth action, a fifteenth action, a sixteenth action, a seventeenth action, an eighteenth action, a nineteenth action, a twentieth action, a twenty-first action, a twenty-second action, and a twenty-third action.

2. The law enforcement interaction method according to claim 1
wherein the subscriber in a first vehicle has been stopped by an appropriate authority for a reasonable articulable suspicion;
wherein the first vehicle further comprises a visible registration number;
wherein the appropriate authority is in a second vehicle;
wherein the subscriber further comprises a subscriber personal data device.

3. The law enforcement interaction method according to claim 2 wherein the method to document the transaction is a method that allows for the transmittal of documentation between the appropriate authority and the subscriber.

4. The law enforcement interaction method according to claim 3 wherein the method to terminate the communication links is a method that closes down the two-way bridge between the subscriber video communication link and the appropriate authority first video communication link after the transaction between the appropriate authority and the subscriber has been completed.

5. The law enforcement interaction method according to claim 4
wherein the appropriate authority takes the first action to pull over a first vehicle on the basis of the appropriate authority's reasonable articulable suspicion;
wherein the appropriate authority takes the second action to collect the visible registration number of the first vehicle;
wherein the appropriate authority takes the third action to transmit the visible registration number, the appropriate authority gaps coordinates, and the appropriate authority's reasonable articulable suspicion to the data management authority;

wherein the data management authority takes the fourth action to process the visible registration number to determine if the vehicle is registered to a subscriber;

wherein if the vehicle is not registered to a subscriber, the data management authority takes the fifth action to inform the appropriate authority to proceed with an appropriate alternate procedure;

wherein if the vehicle is registered to a subscriber, the data management authority takes the sixth action to retrieve the stored subscriber information;

wherein the subscriber information includes the driver's license information, the driver's license image, the personal data device contact information, the biometric validation information, and a subscriber duress word;

wherein the data management authority further takes the seventh action to implement a procedure to directly contact the subscriber application on the subscriber personal data device;

wherein if the data management authority does not receive a response from the subscriber application on the subscriber personal data device, the data management authority takes the eighth action to send an SMS message directly to the subscriber personal data device requesting that the subscriber activate the subscriber application on the subscriber personal data device;

wherein if the data management authority determines that the subscriber application on the subscriber personal data device has not been activated, the data management authority takes the ninth action to inform the appropriate authority to proceed with the appropriate alternate procedure;

wherein once the data management authority determines that the subscriber application on the subscriber personal data device is activated, the data management authority takes the tenth action to request the subscriber GPS coordinates and the subscriber biometric authentication from the subscriber;

wherein if the data management authority determines that the subscriber biometric authentication or the subscriber GPS coordinates is invalid or has not been received, the data management authority takes the eleventh action to inform the appropriate authority to proceed with the appropriate alternate procedure;

wherein if the data management authority determines that the subscriber biometric authentication is valid, the data management authority takes the twelfth action to compare the subscriber GPS coordinates to the appropriate authority GPS coordinates;

wherein if the data management authority determines that the subscriber GPS coordinates and the appropriate authority GPS coordinates are not at the same location, the data management authority takes the thirteenth action to inform the appropriate authority to proceed with the appropriate alternate procedure;

wherein if the data management authority determines that the subscriber GPS coordinates and the appropriate authority GPS coordinates are at the same location, the data management authority takes the fourteenth action to request subscriber permission to open the subscriber video communication link;

wherein if the subscriber refuses permission, the data management authority takes the fifteenth action to inform the appropriate authority to proceed with the appropriate alternate procedure;

wherein if the subscriber grants permission, the data management authority takes the sixteenth action to open the subscriber video communication link and transmits the subscriber information as well as the subscriber duress word to the appropriate authority;

wherein the data management authority further takes the seventeenth action to provide the subscriber with the identity of the appropriate authority and the appropriate authority's reasonable articulable suspicion;

wherein the data management authority further takes the eighteenth action to open the appropriate authority first video communication link, the appropriate authority second video communication link, and the supervisory authority video communication link;

wherein the data management authority further takes the nineteenth action to create a two-way bridge between the subscriber video communication link and the appropriate authority first video communication link;

wherein the data management authority further takes the twentieth action to create a two-way bridge between the supervisory authority video communication link and the appropriate authority second video communication link;

wherein the data management authority further takes the twenty-first action to create a one-way bridge between the subscriber video communication link and the supervisory authority video communication link;

wherein the appropriate authority further takes the twenty-second action to then communicate directly with the subscriber according to the specific processing procedures that apply to the appropriate authority's reasonable articulable suspicion;

wherein the appropriate authority takes the twenty-third action to prepare documentation of the interaction between the subscriber and the appropriate authority.

6. The law enforcement interaction method according to claim 5 wherein the method to document the transaction comprises a twenty-fourth action, a twenty-fifth action, a twenty-sixth action, and a twenty-seventh action;

wherein the appropriate authority takes the twenty-fourth action to transmit the documentation of the interaction to the data management authority;

wherein the data management authority takes the twenty-fifth action to request permission from the subscriber to transmit the documentation of the interaction directly to the subscriber;

wherein if the subscriber refuses permission, the data management authority takes the twenty-sixth action to inform the appropriate authority to proceed with the appropriate alternate procedure;

wherein if the subscriber grants permission, the data management authority takes the twenty-seventh action to transmit the documentation of the interaction to the subscriber.

7. The law enforcement interaction method according to claim 6 wherein the method to terminate the communication links comprises a twenty-eighth action and a twenty-ninth action;

wherein after an opportunity is provided to the subscriber to review the documentation of the interaction with the appropriate authority, the data management authority takes the twenty-eighth action to terminate the interaction;

wherein the data management authority: takes the twenty-ninth action to: a) terminate the two way bridge between the subscriber video communication link and the appropriate authority first video communication link; b) terminate the one way bridge between the subscriber video communication link and the supervisory authority video communication link; and, c) terminate the two way bridge between the supervisory authority video communication link and the appropriate authority second video communication link after a debriefing period between the supervisory authority and the appropriate authority.

8. The law enforcement interaction method according to claim 2 wherein the subscriber personal data device further comprises a subscriber video module, a subscriber GPS module, a subscriber biometric sensor, and a subscriber application;

wherein the subscriber video module is an electronic device;

wherein the subscriber video module transmits and receives video and audio;

wherein the subscriber GPS module is an electrical device that communicates with the GPS to determine the GPS coordinates of the subscriber GPS module;

wherein when queried by the subscriber personal data device, the subscriber GPS module transfers the GPS coordinates to the subscriber personal data device;

wherein the subscriber GPS module generates a subscriber GPS coordinates;

wherein the subscriber biometric sensor is an electronic device;

wherein the subscriber biometric sensor generates a subscriber biometric authentication for the supervisory authority.

9. The law enforcement interaction method according to claim 8 wherein the appropriate authority further comprises an appropriate authority personal data device;

wherein the appropriate authority personal data device is a programmable electrical device that provides data management and communication services through one or more functions referred to as an appropriate authority application.

10. The law enforcement interaction method according to claim 9 wherein the appropriate authority personal data device further comprises an appropriate authority video module and an appropriate authority GPS module;

wherein the appropriate authority video module is an electronic device;

wherein the appropriate authority video module transmits and receives video and audio of the interior of the second vehicle which generates the appropriate authority first video communication link and the appropriate authority second video communication link with the data management authority;

wherein the appropriate authority GPS module is an electrical device that communicates with the GPS to determine the GPS coordinates of the appropriate authority GPS module;

wherein when queried by the appropriate authority personal data device, the appropriate authority GPS module transfers the GPS coordinates to the appropriate authority personal data device;

wherein the appropriate authority GPS module generates the appropriate authority GPS coordinates used to authenticate the location of the appropriate authority.

11. The law enforcement interaction method according to claim 10 wherein the method to establish the communication links and perform subscriber authentication is a method that establishes a two-way bridge between the subscriber video communication link and the appropriate authority first video communication link after confirmation of the identification of the subscriber.

12. The law enforcement interaction method according to claim 11 wherein the method to document the transaction is a method that allows for the transmittal of documentation between the appropriate authority and the subscriber.

13. The law enforcement interaction method according to claim 12 wherein the method to terminate the communication links is a method that closes down the two-way bridge between the subscriber video communication link and the appropriate authority first video communication link after the transaction between the appropriate authority and the subscriber has been completed.

14. The law enforcement interaction method according to claim 13
wherein the data management authority manages the subscriber information and a plurality of communication bridges;
wherein the supervisory authority maintains a continuous communication link between the data management authority and the supervisory authority that is referred to as the supervisory authority video communication link.

15. The law enforcement interaction method according to claim 14
wherein the method to establish the communication links and perform subscriber authentication comprises a first action, a second action, a third action, a fourth action, a fifth action, a sixth action, a seventh action, an eighth action, a ninth action, a tenth action, an eleventh action, a twelfth action, a thirteenth action, a fourteenth action, a fifteenth action, a sixteenth action, a seventeenth action, an eighteenth action, a nineteenth action, a twentieth action, a twenty-first action, a twenty-second action, and a twenty-third action;
wherein the appropriate authority takes the first action to pull over a first vehicle on the basis of the appropriate authority's reasonable articulable suspicion;
wherein the appropriate authority takes the second action to collect the visible registration number of the first vehicle;
wherein the appropriate authority takes the third action to transmit the visible registration number, the appropriate authority gaps coordinates, and the appropriate authority's reasonable articulable suspicion to the data management authority;
wherein the data management authority takes the fourth action to process the visible registration number to determine if the vehicle is registered to a subscriber;
wherein if the vehicle is not registered to a subscriber, the data management authority takes the fifth action to inform the appropriate authority to proceed with an appropriate alternate procedure;
wherein if the vehicle is registered to a subscriber, the data management authority takes the sixth action to retrieve the stored subscriber information;
wherein the subscriber information includes the driver's license information, the driver's license image, the personal data device contact information, the biometric validation information, and a subscriber duress word;
wherein the data management authority further takes the seventh action to implement a procedure to directly contact the subscriber application on the subscriber personal data device;
wherein if the data management authority does not receive a response from the subscriber application on the subscriber personal data device, the data management authority takes the eighth action to send an SMS message directly to the subscriber personal data device requesting that the subscriber activate the subscriber application on the subscriber personal data device;
wherein if the data management authority determines that the subscriber application on the subscriber personal data device has not been activated, the data management authority takes the ninth action to inform the appropriate authority to proceed with the appropriate alternate procedure;
wherein once the data management authority determines that the subscriber application on the subscriber personal data device is activated, the data management authority takes the tenth action to request the subscriber GPS coordinates and the subscriber biometric authentication from the subscriber;
wherein if the data management authority determines that the subscriber biometric authentication or the subscriber GPS coordinates is invalid or has not been received, the data management authority takes the eleventh action to inform the appropriate authority to proceed with the appropriate alternate procedure;
wherein if the data management authority determines that the subscriber biometric authentication is valid, the data management authority takes the twelfth action to compare the subscriber GPS coordinates to the appropriate authority GPS coordinates;
wherein if the data management authority determines that the subscriber GPS coordinates and the appropriate authority GPS coordinates are not at the same location, the data management authority takes the thirteenth action to inform the appropriate authority to proceed with the appropriate alternate procedure;
wherein if the data management authority determines that the subscriber GPS coordinates and the appropriate authority GPS coordinates are at the same location, the data management authority takes the fourteenth action to request subscriber permission to open the subscriber video communication link;
wherein if the subscriber refuses permission, the data management authority takes the fifteenth action to inform the appropriate authority to proceed with the appropriate alternate procedure;
wherein if the subscriber grants permission, the data management authority takes the sixteenth action to open the subscriber video communication link and transmits the subscriber information as well as the subscriber duress word to the appropriate authority;
wherein the data management authority further takes the seventeenth action to provide the subscriber with the identity of the appropriate authority and the appropriate authority's reasonable articulable suspicion;
wherein the data management authority further takes the eighteenth action to open the appropriate authority first video communication link, the appropriate authority second video communication link, and the supervisory authority video communication link;
wherein the data management authority further takes the nineteenth action to create a two-way bridge between the subscriber video communication link and the appropriate authority first video communication link;

wherein the data management authority further takes the twentieth action to create a two-way bridge between the supervisory authority video communication link and the appropriate authority second video communication link;

wherein the data management authority further takes the twenty-first action to create a one-way bridge between the subscriber video communication link and the supervisory authority video communication link;

wherein the appropriate authority further takes the twenty-second action to then communicate directly with the subscriber according to the specific processing procedures that apply to the appropriate authority's reasonable articulable suspicion;

wherein the appropriate authority takes the twenty-third action to prepare documentation of the interaction between the subscriber and the appropriate authority.

16. The law enforcement interaction method according to claim 15 wherein the method to document the transaction comprises a twenty-fourth action, a twenty-fifth action, a twenty-sixth action, and a twenty-seventh action;

wherein the appropriate authority takes the twenty-fourth action to transmit the documentation of the interaction to the data management authority;

wherein the data management authority takes the twenty-fifth action to request permission from the subscriber to transmit the documentation of the interaction directly to the subscriber;

wherein if the subscriber refuses permission, the data management authority takes the twenty-sixth action to inform the appropriate authority to proceed with the appropriate alternate procedure;

wherein if the subscriber grants permission, the data management authority takes the twenty-seventh action to transmit the documentation of the interaction to the subscriber.

17. The law enforcement interaction method according to claim 16 wherein the method to terminate the communication links comprises a twenty-eighth action and a twenty-ninth action;

wherein after an opportunity is provided to the subscriber to review the documentation of the interaction with the appropriate authority, the data management authority takes the twenty-eighth action to terminate the interaction;

wherein the data management authority: takes the twenty-ninth action to: a) terminate the two way bridge between the subscriber video communication link and the appropriate authority first video communication link; b) terminate the one way bridge between the subscriber video communication link and the supervisory authority video communication link; and, c) terminate the two way bridge between the supervisory authority video communication link and the appropriate authority second video communication link after a debriefing period between the supervisory authority and the appropriate authority.

\* \* \* \* \*